United States Patent [19]

Dyma et al.

[11] Patent Number: 4,692,041
[45] Date of Patent: Sep. 8, 1987

[54] DOCUMENT ENCODER

[75] Inventors: Horst Dyma; Armin Heindke, both of Villingen-Schwenningen, Fed. Rep. of Germany

[73] Assignee: Mannesmann Kienzle GmbH, Villingen, Fed. Rep. of Germany

[21] Appl. No.: 684,608

[22] Filed: Dec. 21, 1984

[30] Foreign Application Priority Data

Dec. 27, 1983 [DE] Fed. Rep. of Germany ....... 3347168

[51] Int. Cl.$^4$ ............................................. B41J 3/54
[52] U.S. Cl. ..................................... 400/82; 400/103; 400/188; 400/642
[58] Field of Search ............... 400/188, 189, 190, 636, 400/642, 580, 279, 82, 103

[56] References Cited

U.S. PATENT DOCUMENTS

| 3,718,244 | 2/1973 | Bukowski et al. | 400/580 X |
| 3,817,367 | 6/1974 | Tramposch et al. | 400/189 X |
| 3,964,672 | 6/1976 | Aylsworth et al. | 234/35 |
| 4,082,945 | 4/1978 | Van de Goor et al. | 235/419 |

FOREIGN PATENT DOCUMENTS

| 0019080 | 11/1980 | European Pat. Off. | |
| 0037941 | 10/1981 | European Pat. Off. | |
| 2231580 | 1/1974 | Fed. Rep. of Germany | |
| 2854862 | 6/1980 | Fed. Rep. of Germany | |
| 2951069 | 7/1981 | Fed. Rep. of Germany | 400/188 |
| 3105853 | 11/1981 | Fed. Rep. of Germany | |
| 3209083 | 9/1982 | Fed. Rep. of Germany | |
| 2507965 | 12/1982 | France | |

OTHER PUBLICATIONS

"Duplex Printing With A Band Printer,", by Drejza, IBM Technical Disclosure Bulletin, vol. 23, No. 9, 2/1981.
Front and Rear Wire Matrixline Printer, by Lisinski, IBM Technical Disclosure Bulletin, vol. 21, No. 5, 10/1978.
IBM Technical Disclosure Bulletin, vol. 21, No. 1, Jun. 1978.

Primary Examiner—Edgar S. Burr
Assistant Examiner—Moshe I. Cohen
Attorney, Agent, or Firm—Toren, McGeady & Associates

[57] ABSTRACT

A document encoder is described, which is conceived as a compact desk set. In order to serve as a multi purpose unit and in spite of that exhibit a compact type of construction, the various printing devices (2, 4, 6, 7, 8) and print backings (41, 42; 47; 55; 64, 71) impacting the document from its front- and back side are arranged stationary in a chassis (1), while the printing process in direction of the lines is accomplished solely through conveying the document by means of a conveyor device. The print devices and the print backings are arranged so that they apply print to the front- and back sides of the document in a partially overlapping way. The document conveyor path (10) is U-shaped, whereby the input station (11) is located at one leg of the conveyor path (10), the printing devices (2, 4, 6, 7, 8) at the other leg (15). The printing mechanisms themselves are either type wheel printing mechanisms (3), stamping print mechanisms (4, 6) or needle print mechanisms (7, 8), according to the desired needs.

8 Claims, 4 Drawing Figures

DOCUMENT ENCODER

The invention relates to a document encoder as a compact desk equipment, which comprises an input station for the documents and a transport apparatus for transporting the document into a storage station, where the document travels through several modularly constructed and selectively combinable printing means for the application of the most diverse markings partially on the front side and partially on the back side of the document.

In document encoders one can distinguish between so-called multi purpose equipment on the one hand and single purpose equipment which therefore is used either only for precoding of the documents or only for the repeat coding of the documents. Generally, the multi purpose equipment is constructed modularly such that it can be randomly complemented or reduced by the addition of or elimination of individual components. On the contrary, the pre- or - repeat encoders are constructed to be essentially less expensive and are thus as a rule only single purpose devices and cannot be easily added to or subtracted from by rigging. The possibility or necessity of adding to or subtracting from so-called multi purpose devices has resulted in relatively large structural entities, which could be realized only in the form of stationary devices. This was particularly the case in known document encoders if the document, during its processing, had to travel through several printing stations, such as the actual code printer which produces the coding list and has to present the print in an optically readable for, the endorsing- and cancellation stamps and possible personalizing printers and the like. Here the layout was generally arranged so the document passed the individual stations one after the other on its transport path, so that the length of the conveyance path represented the sum of the different printing devices acting upon the document or the length of the corresponding printing areas. However, the length of the transport path at the same time determined the overall dimensions of the encoder.

In contrast, it is the task of the invention to equip an electronic document encoder with the most diverse printing devices in such a layout, so that, even by combining the largest possible number of printing devices, such compact type of construction results, that the apparatus does no longer have to be built as a stationary model but can be offered as a desk set.

Accordingly the invention is characterized in that a chassis is provided comprising installation means for parts carrying the printer as well as for the printing beds in such an arrangement, that the printing devices and the printing beds are stationary in direction of the printed lines, where only the transport device generates a relative movement between the printing device and the document, and the installation means for the printing devices and the print beds are provided in such a relative layout, that the printing devices acting upon the front- and back sides of the documents work at least partially overlapping together with the document.

A particularly compact constructional form of this arrangement results, if the transport path is shaped in the form of a U and the input station is located at one leg of this U-shaped transport path, while all the printing devices lie at the other leg of the transport path.

For an encoder printing mechanism one uses preferably a printing device having type letters on movable spokes arranged in a type wheel printer. This type wheel printing mechanism is arranged stationary in a carrying part and can be pulled back or pivoted for the purpose of replacing the type disk.

An essential feature of the invention is also that two stamping print mechanisms, serving for endorsing or cancelling of the documents or checks, act each upon the front- and back side of the document, and are so arranged that they act at the same place of the transport or conveyor path upon the document but are staggered heightwise.

Two further printing devices designed as needle print heads can act in an overlapping fashion selectively upon the front- or back side of the document in such a manner that one printing device serves, for example, for endorsements, while the other printing device produces a so-called personalizing print, meaning, for instance, printing an address on a check or the like.

Further details of the layout according to the invention are disclosed in the course of the following description of an embodiment example of the invention in various forms of presentation.

Figure 1:
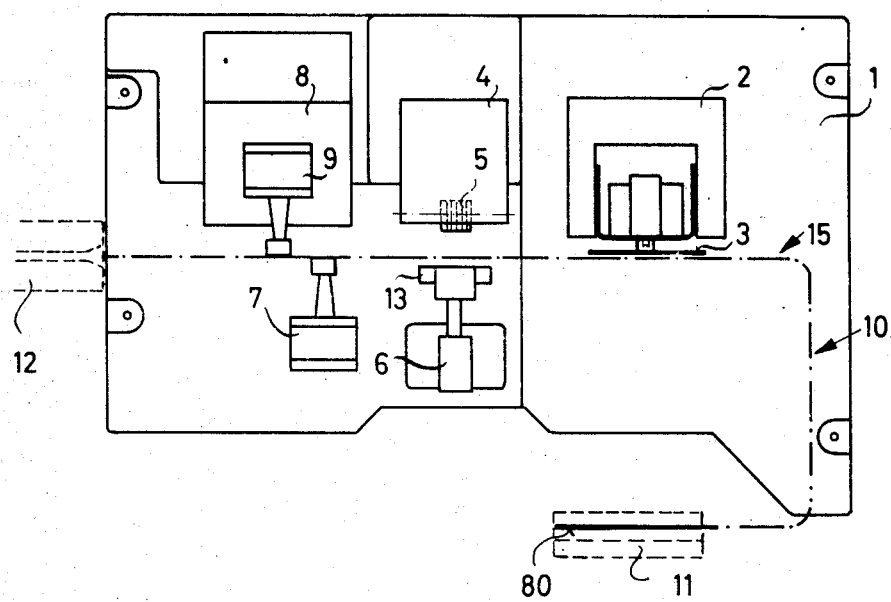
FIG. 1 is thereby an overview of the layout according to the invention.

At first an overview of the layout according to the invention should be given by consideration of the chart according to FIG. 1. In a chassis 1 five printing devices are supported or attached, namely an encoding printing mechanism 2 with a type wheel disk 3, a stamping printing mechanism 4 with a numbering device 5, a further stamping print mechanism 6 with a printing block 13, an endorsement printing device 7 in the form of a needle printer and selectively a personalizing printing device 8, which is also in the form of a needle printer 9. The transport or conveyor path 10 for the documents 80 is indicated only schematically. It starts at the input station 11, which lies at the one free leg of the U-shaped transport path 10. At the other free leg 15 of the transport path lie all the printing devices on both sides of this transport path, so that the document can be printed on both sides. The transport path 10 then terminates in a storage container 12.

The type wheel printing mechanism 2, 3 is the actual encoding printing mechanism, which works together with an encoding strip on the document and produces optically readable markings. For this the type wheel 3 is designed in the shape of a wheel equipped with elastic spokes, at whose upper ends the full contour print type is arranged. The two stamping print mechanisms 4 and 6 are striker print mechanisms, which produce stamp shaped imprints, whereby consecutive account numbers are assigned to a check by the stamping print mechanism 4 by means of a numbering device 5, while the stamping print mechanism 6 essentially comprises a processing print block 13 which is associated with the machine operation and can be removed from same when the work is finished. The needle print mechanism 7 produces a variable endorsement print, which, for instance, includes the primary endorsement print, which, for instance, includes the primary note number and the booking date. The personalizing printer 8 on the contrary is, for instance, provided to apply an address or the like on several lines one above the other on a check. It should be pointed out at this place, that all the print devices 2, 4, 6, 7 and 9 can be used selectively, so that the apparatus can randomly be added to or subtracted from.

Figures 2A, 2B:
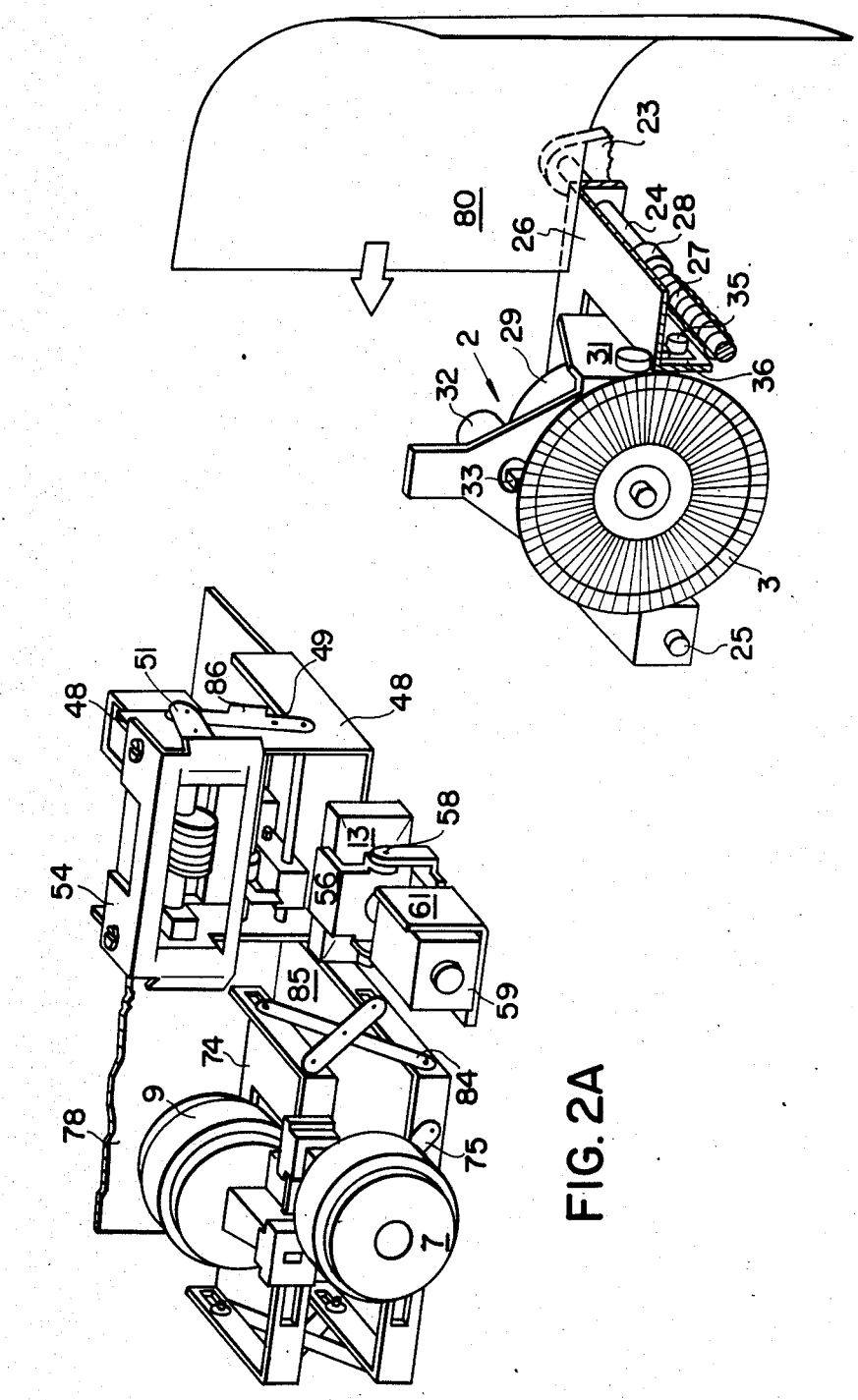
FIG. 2 is a presentation in perspective of the arrangement of the various printing mechanisms, while FIGS. 3a and 3b taken together reflect a top view of the essential parts of the layout according to the invention.
Figure 3:
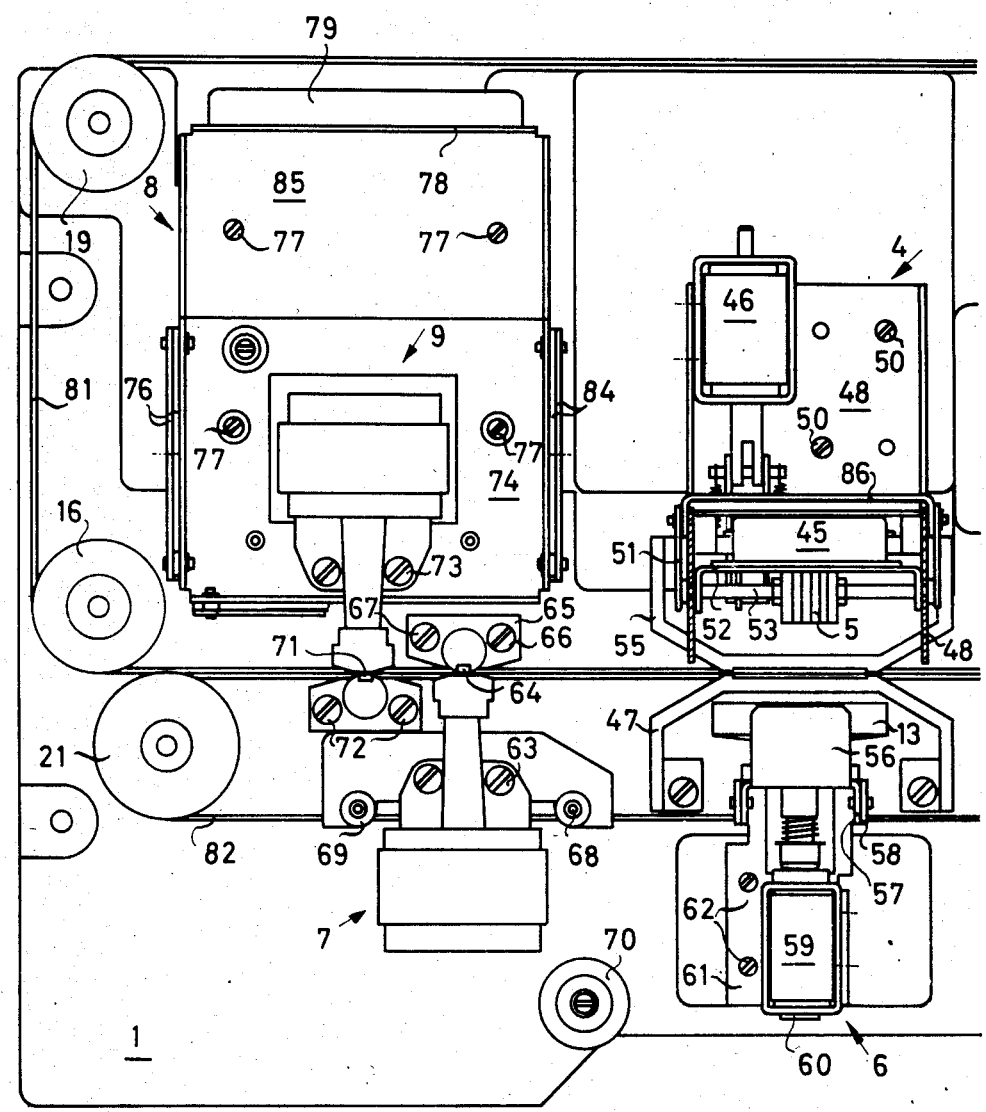
Figure 3B:
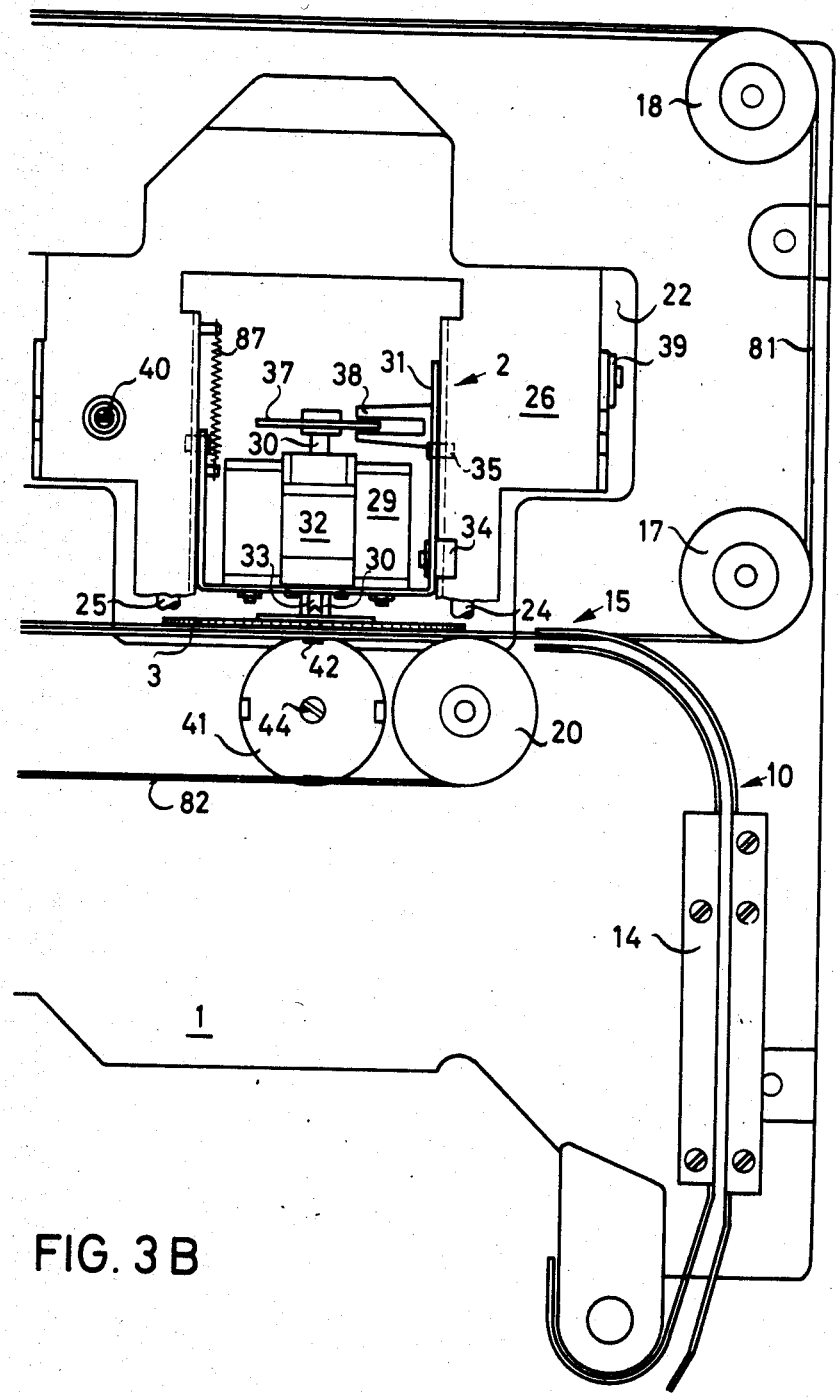

A larger and therefore more detailed presentation of the arrangement of the print devices according to the invention is seen from FIG. 2, particularly from FIGS. 3a and 3b, which taken together correspond to the presentation according to FIG. 1. As already explained, the conveyor path 10 for the documents is essentially designed to be U-shaped, where one recognizes on the right of FIG. 3b the part 14 of the conveyor path connecting the two legs of the conveyor path and the part 15 on which the various printing devices are supported. Conveying proceeds over two conveyor belts 81, 82 between which the document is tightly clamped. The document is taken over by these two belts 81 and 82 on the leg 15 of the conveyor path 10. The one belt 81 runs around the driving pulleys 16, 17 and 18, 19, the other belt, which presses the document against the first one, is guided and driven by the pulleys 20 and 21. The drive is accomplished by means of a here not indicated step motor and a corresponding gear box. Between these conveyor pulleys 20 and 21 and 16 and 17 additional conveyor- or clamping pulleys are in each case arranged, which serve for accurate guiding and clamping of the document, but which have been left out for purposes of clarity.

Axles 24 and 25 are attached between several retaining lugs 23 (FIG. 2) in a cavity 22 of the chassis 1, on which the carrier part 26 for the printing device 2 is supported so as to be displaceable rearwards. The parts 23 are the installation means for the printing device 2, the part 26 is the carrier part for the printing device 2. By means of springs 27, which abut on the one side at a stationary part 28 and on the other side at the carrying part 26, the carrier part 26 is shifted forward into the printing position and can be slid back against the force of the springs 27 for the purpose of replacing the type wheel 3. The type wheel 3 is driven by a drive motor 29, whereby the type wheel 3 is attached to the motor shaft 30. Above the motor 29, which is retained together with the type wheel 3 in a pivotable carrier part 31, an impact magnet 32 is yet located, which allows the type of the type wheel 3 to be impelled forward into the printing position by means of an actuating member 33.

The pivotable carrier part 31 supports itself by means of an abutment bolt 34 upon the carrier part 26 and is retained in working position through a spring 87. Pivotable bolts 35 are arranged at the carrier part 31, which permit a rearward displacement of the carrier part 26 relative to the support axles 24 and 25 through oblong holes 36 and additionally allow the part 31 to pivot, so that the type wheel 3 can be replaced. A standardization disk 37 attached to the motor shaft 30 acts together with a light barrier 38, in order to generate a standardization signal at each single revolution of the type wheel 3. Through a click stop arrangement 39, not shown in detail, the carrier part 26 is retained in the pulled back position and can be again disengaged, when replacement of the type wheel 3 has been completed. A drive motor which is not shown in the Figure is located in the carrier part 26 destined for the color tape contained in a color tape cassette, which can be coupled by a coupling pin 40 with the drive of the color tape rolls in the cassette.

A vertically arranged print roll 41 which is rotatable serves as printing base for the type wheel 3. Through turning of the roll 41 four different print pads 42 located opposite each other are brought into the printing position. It should also be mentioned at this place that it is possible to arrange on the type wheel either four different sets of types, for instance OCR A, OCR B, CMC 7 etc., also four sets of the same type. Because the print backing pad 42 is in any case subject to considerable wear, the rotatable roll 41 is provided with four different print backing pads 42. A screw 44 serves as installation means for the print rolls 41 in the chassis 1.

The two stamping print mechanisms 4 and 6 follow behind the encoding print mechanism 2 on the conveyor path 10. The stamping print mechanism 4 is a numbering print mechanism 5, which prints consecutive numbers on the document. The numbering device 5 is pivotably supported and is in the rest position in contact with a stamp pad 45. The numbering device 5 is pivotable by means of a magnet 46, so that it is imprinted on the print backing pad 47. The numbering device 5 with the stamp pad 45 is arranged in a carrying part 48, which is attached in the chassis 1 by means of two screws 50. The screws 50 represent the installation means for the stamping print mechanism 4 in the chassis 1. The carrier part 48 carries levers 86 pivotable around axes 49, at which support levers 51 for the numbering device 5 are articulated. The frame part 32, in which the numbering device 5 is supported on its axle 53, is rotated through 180° by means of a guide not shown here, so that the printing place of the numbering device 5 is brought into engagement with the printing support 47. A shutter 54 shields the numbering device against unintended handling, so that the person operating the machine does not dirty his fingers.

The stamping print mechanism 6 is staggered in height but arranged oppositely oriented. This can be seen in particular from the presentation according to FIG. 2. In the case of the stamping print mechanism 4, the print backing 47 is arranged above the stamping print mechanism 6, while conversely in the case of the stamping print mechanism 6 the print backing 55 is arranged below the stamp print mechanism 4. The stamping print mechanism 6 consists of the stamp pad 13 saturated with color, which is a printing block and which contains data of the bank using it and pertaining to the operating person. The printing block 13 is arranged at an attaching part 56, which is attached pivotably at the two lugs 57. In this way and manner the printing block 13 can be pivoted around the pivot point 58, so that it can be replaced by the operator. A Magnet 59 acts through its armatures 60 on the printing block 13, so that it is brought for imprint onto the pring backing 55. The print block 13 with its carrier part 57 and the magnet 59 are supported in the carrier part 61, which is attached in the chassis 1 by means of two screws 62. The screws 62 represent the installation means for the stamping print mechanism 6.

After the two stamping print mechanisms 4 and 6 the two printing devices 7 and 8 which are needle print mechanisms follow in the extent of the conveyor path 10. The print mechanism 7 is arranged to be stationary and is attached directly in the chassis 2 by means of two screws 63. As already explained, the needle print mechanism 7 serves for the entering of additional endorsement items by imprinting of a primary file designation and also the date on the document to be so marked. The printing device is in the form of a needle print head, whose print needles act on a print backing 64. The print backing 64 is attached on a carrier part 65, which is connected by means of two screws 66 and 67 serving as an installation means with the chassis 1. Two installation pins 68 and 69 serve for fixing of the color tape cassette, while a coupling pin 7, which is driven by a motor not shown here, serves to drive the color tape. The color tape cassette itself has been omitted for purposes of better elasticity.

It is seen that the print backing 64, staggered with respect to the print backing 71 for the second needle print mechanism 9, is arranged in the printing device 8. These two print mechanisms can therefore act at the same height upon the surface of the document 89 overlapping from the front and back side. The print backing 71 is connected by means of two screws 72 as installation means in the chassis 1. While the print mechanism 7 is absolutely stationary, the print mechanism 8 with its needle print head 9 is indeed stationary in the direction of the lines, but arranged on the support plate 74 in such a way that it is adjustable in height. The needle print head 9 is for this purpose attached in the carrier plate 74 by means of screws 73. The carrier plate 74 is connected with the support part 85 by means of three scissor lever pairs 84, 75, 76, which support part is attached in the chassis 1 by means of attachment screws 77. The support part 85 has a rear wall 78 standing vertically, at which a gear box 79 is attached. The carrier plate 74 is lifted by the gear box by a cam plate not shown here, when the gear box 79 is correspondingly engaged. This entails that the needle print head 9 is able to print not only on one line but can even apply personalized prints in several lines.

The area shown shaded in FIG. 2 is intended to indicate that this is the reference plane, impacted by all printing devices and in which the document 80 is conveyed by the conveyor device 10. Hereby the printing device 2, the stamping print mechanism 4 and the personalizing print mechanism 8 act upon the front side of the document, while the stamping print mechanism 6 and the needle print mechanism 7 are brought into action upon the back side of the document. The print mechanisms can work in an overlapping way depending upon the conveyance of the document. For example, the two stamping print mechanisms 4 and 6 can produce their imprints simultaneously and the two print mechanisms 7 and 8 can at least partially work in an overlapping way.

We claim:

1. A document encoder means encoding commercial paper, for arranged as a compact desk set including an input station for a document, a transport device transporting of the document to a storage station, said document passing several modularly designed and selectively combinable printing devices applying diverse markings partly on a front- and partly on a back side of the document, the improvement comprising: at least two printing devices arranged to act selectively respectively on the front and back sides of said document;

a chassis including installation means for carrying parts of the printing devices and print backings, the printing devices and print backings being stationary in the direction of the print lines, with only the transport device generating relative movement between the printing devices and the documents; said transport device having a U-shaped transport path extending from an input station located at the end of one leg of said transport path, all of said combinable printing devices being located along the other leg of said path;

said installation means for the printing devices and the print backings being provided along and on both sides of said other leg of said U-shaped path, such that the printing devices impacting the front- and back side of the documents operate together with the document in at least a partially overlapping way.

2. A document encoder according to claim 1, wherein the printing device causing the encoding print is a type wheel print mechanism with the print type arranged on movable spokes.

3. A document encoder according to claim 2, wherein the type wheel print mechanism is arranged on its support part so that it can be pulled back from the print support and pivoted to allow replacement of the type disk.

4. A document encoder according to calim 3, wherein several identical or differing type sets are arranged on the type wheel.

5. A document encoder according to claim 4, wherein the print backing is equipped with several print abutment supports and can be rotatably brought into respectively one operating position.

6. A document encoder according to claim 1, wherein two stamping mechanisms for affixing endorsement and cancellation stamps can be attached with installation means on their support parts selectively on either side of the transport path for the documents in such a way that they act in the transport direction essentially at the same place but staggered in height upon the document.

7. A document encoder according to claim 1, wherein said at least two printing devices are in the form of needle print heads.

8. A document encoder according to claim 1, wherein the support part of a printing device equipped with a needle print head can be adjusted in height by a gear box, so that with repeated passage of the document over the transport means a print on several lines results.

* * * * *